United States Patent
Gobriel et al.

(10) Patent No.: US 11,005,884 B2
(45) Date of Patent: May 11, 2021

(54) DENIAL OF SERVICE MITIGATION WITH TWO-TIER HASH

(71) Applicant: Intel Corporation, Santa Clara, CA (US)

(72) Inventors: Sameh Gobriel, Dublin, CA (US); Christian Maciocco, Portland, OR (US); Byron Marohn, Beaverton, OR (US); Ren Wang, Portland, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 15/720,821

(22) Filed: Sep. 29, 2017

(65) Prior Publication Data

US 2019/0104150 A1   Apr. 4, 2019

(51) Int. Cl.
| | | |
|---|---|---|
| *H04L 29/06* | (2006.01) | |
| *H04L 9/32* | (2006.01) | |
| *G06F 21/55* | (2013.01) | |
| *G06F 16/22* | (2019.01) | |

(52) U.S. Cl.
CPC ...... *H04L 63/1458* (2013.01); *G06F 16/2255* (2019.01); *G06F 21/554* (2013.01); *H04L 9/3239* (2013.01); *H04L 63/1416* (2013.01); *H04L 63/1491* (2013.01)

(58) Field of Classification Search
CPC .............. H04L 63/1458; H04L 9/3239; H04L 63/1416; H04L 63/1491; G06F 21/554; G06F 16/2255

See application file for complete search history.

(56) References Cited

U.S. PATENT DOCUMENTS

| | | | | |
|---|---|---|---|---|
| 7,584,507 | B1* | 9/2009 | Nucci | H04L 63/1416 726/22 |
| 2004/0230696 | A1* | 11/2004 | Barach | H04L 69/22 709/238 |
| 2005/0213570 | A1* | 9/2005 | Stacy | H04L 49/9042 370/389 |
| 2006/0075489 | A1* | 4/2006 | Ganguly | H04L 63/1458 726/22 |
| 2008/0125043 | A1* | 5/2008 | Karmanenko | H04W 12/1204 455/41.2 |
| 2009/0073891 | A1* | 3/2009 | Duffield | H04L 63/1408 370/252 |
| 2017/0270119 | A1* | 9/2017 | Kfir | H04L 9/0894 |
| 2020/0186355 | A1* | 6/2020 | Davies | H04L 9/3239 |

* cited by examiner

*Primary Examiner* — J. Brant Murphy
(74) *Attorney, Agent, or Firm* — Patent Capital Group

(57) ABSTRACT

A computing apparatus for providing a node within a distributed network function, including: a hardware platform; a network interface to communicatively couple to at least one other peer node of the distributed network function; a distributor function including logic to operate on the hardware platform, including a hashing module configured to receive an incoming network packet via the network interface and perform on the incoming network packet a first-level hash of a two-level hash, the first level hash being a lightweight hash with respect to a second-level hash, the first level hash to deterministically direct a packet to one of the nodes of the distributed network function as a directed packet; and a denial of service (DoS) mitigation engine to receive notification of a DoS attack, identify a DoS packet via the first-level hash, and prevent the DoS packet from reaching the second-level hash.

25 Claims, 11 Drawing Sheets

Non-transitory computer-readable storage medium 702, as may be implemented in embodiments of FIG. 6.

Programming instructions 704 to cause a digital content consumption device, in response to execution of the instructions by a processor of the digital content consumption device, to practice aspects of embodiments of the processes of FIG. 5.

DENIAL OF SERVICE MITIGATION WITH TWO-TIER HASH

FIELD OF THE SPECIFICATION

This disclosure relates in general to the field of computer networking, and more particularly, though not exclusively, to a system and method for denial of service mitigation with a two-tier hash.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
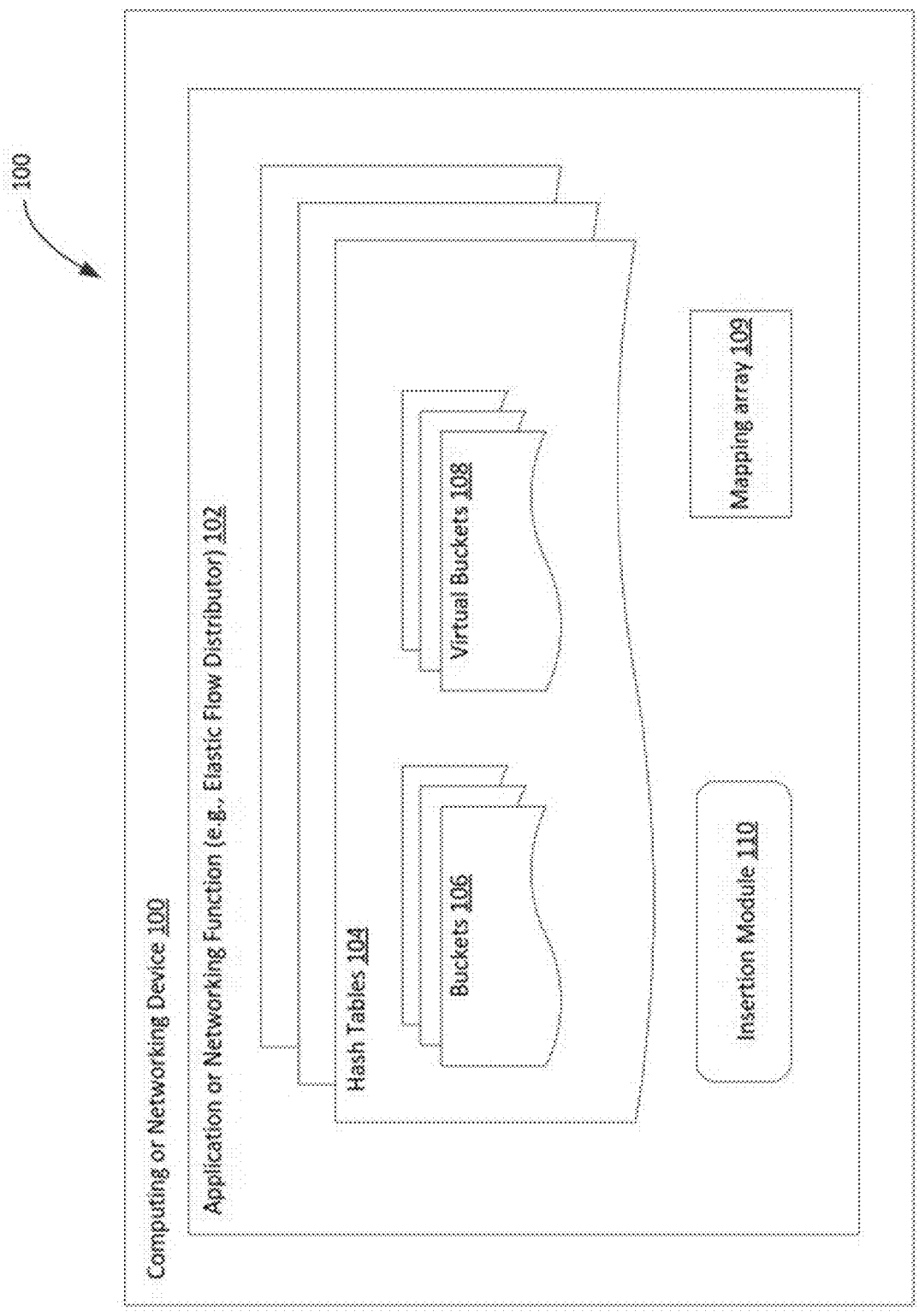
FIG. 1 illustrates an example computing/networking device with the hash table entries rebalancing technology of the present disclosure, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Various computing/networking applications involve flow classifications and/or hash table lookups. For example, as the telecommunication industry transitions to software defined network (SDN) or network function virtualization (NFV) to support current and upcoming usage models such as 5G on standard high volume servers, or the cloud computing industry, scalable and distributed software routing/switching has become one of the key requirements of the packet processing architecture. Two level distributed hashing architecture has been developed to achieve high performance packet switching/routing using either a cluster of standard high-volume servers or a single system composed of multiple CPU cores. In such architecture, network packets are identified in part by lookup in various hash tables. Whether it is two level or one level hashing, the performance of hash table degrades as the number of elements in each hash "bucket" increases.

In legacy hash table implementations, as more entries fill up each bucket of the hash table it takes longer to find an available bucket to insert a new entry into the table. This results in decreased insertion performance. In legacy implementations, when entries are inserted randomly into a fixed number of buckets (as is often the case with real workloads), the number of entries into those buckets tend to form a normal distribution with some buckets containing far more entries than the average, some almost empty, and the rest clustered around the average.

This disclosure addresses these problems by providing an elastic flow distributor (EFD) mechanism employing a perfect hash, by which the entries in the buckets can be automatically rebalanced at insertion time by adding only O(1) operations. This may have the effect of transferring entries from "more full" to "less full" buckets, reducing the maximum number of entries in any one bucket. This may significantly improve performance, particularly when the hash table is highly sensitive to bucket size.

To improve hash table performance, a large number of smaller virtual buckets may be combined together and associated with buckets used for hash table entry lookups and/or entry insertion. In this way, entries may be moved between groups of buckets at entry insertion time while substantially maintaining the performance of the underlying hash table.

For example, a hash table may be sized to hold $2^{21}$ entries (a little over 2 million). The table may be made up of $2^{16}$ (65,536) buckets that may each store $2^5$ (32) items. In addition, $2^{20}$ virtual buckets may be used, with $2^4$ (16) virtual buckets associated for each real bucket.

Thus, when randomly inserting entries each virtual bucket only will have on average 2 entries, with some being larger and smaller again following a statistical normal distribution. As (non-virtual) buckets start to get too full, some virtual buckets may be subtracted from a too-full bucket and added to another bucket that is less full to balance the number of entries per bucket. This is in contrast to legacy hash table implementations that do not use virtual buckets, for example where an entry may be hashed and then 16 bits of the hash may be used to address one of 216 buckets. Statistically, if random keys are inserted in this fashion, perhaps only 30% of 2 million may be inserted before one of those buckets exceeds 32 items and the insert fails.

In examples of the present specification, implementation of the systems and processes herein will better distribute entries across the available buckets and reduce the number of entries in the largest buckets and the standard deviation of the bucket sizes across the entire hash table.

Embodiments of the elastic flow distributor (EFD) of the present specification may be used in various networking and other technologies, including, for example, in a network device having ingress and egress interfaces, such as a switch. In some embodiments, such a network device may include a number of commodity hardware elements that are switched together, and that together appear on the network as a single monolithic device.

Employing the EFD architecture in such a system, a first-level hash provides a very efficient lookup table such as the EFD. The EFD acts as an efficient load balancer and indicates the destination and the cluster, such as a queue, core, VM/container, or host, that the packet should be directed to. The target contains the full flow lookup table for all of its egress interfaces, and rules for performing packet processing. The second-level lookup performed at the destination node finds an exact match for the key and forwards the packet to the correct egress interface for the switch router or other device to recover packet metadata for further processing.

Embodiments of this EFD use a perfect hashing function to support numbers of flow keys on the order of millions. To achieve high load-balancing (i.e., lookup) rates, the EFD does not store the key itself, but rather relies on using perfect hashing to generate a collision-free table. Thus, no key comparison for collision resolution is needed.

Thus, EFD can be viewed as applying a series of hash functions on any input flow, and does not store the actual key and thus does not do any key comparison or matching on the input flow. For example, the input device does not perform a membership test on the input flow. Thus, EFD always points to a destination node regardless of whether the flow has already been pre-inserted into the flow table or not. Exact matching and membership test can be left to the destination node, where a new flow that has not been inserted in the table can be discovered.

Dropping the membership test at the EFD significantly speeds up the first-level lookup, and thus improves the performance and throughput of the device. However, in some cases, it can also expose the device to denial of service (DoS) attacks at the destination node. For example, an attacker may send new flows for the cluster causing the input node to always perform EFD computations, thus wasting resources, before forwarding the packet to the destination node that performs the full lookup only to drop the packets later due to no match. This wastes resources on the destination node, which finally drops the flow because there is no matching entry. Thus, embodiments of the present specification further include a mechanism to mitigate DoS attacks by using a monitoring table at the destination node to mark attackers based, for example, on too many missed lookups from the same source address. A feedback loop may then be used to update the EFD table on input devices to direct DoS traffic to a designated null destination, such as a honeypot or disposal buffer.

Thus, very high performance can be maintained for two-level hashing lookup tables instead of inserting the extra membership test at the source node. This performance can be maintained while simultaneously preventing DoS attacks.

A system and method for denial of service mitigation with a two-tier hash will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 illustrates an example computing/networking device with the hash table entries rebalancing technology of the present disclosure, according to one or more examples of the present specification. A computing/networking device 100 may include an application or networking function 102. In embodiments, this may include an elastic flow distributor (EFD) of an SDN/NFD. In embodiments, the application or networking function 102 may include a number of hash tables 104. In embodiments, the hash tables 104 may include an array of M buckets 106, and virtual buckets 108. Additionally, the application or networking function 102 may further include a mapping array 109, and an insertion module 110 associated with the hash table 104 for inserting and rebalancing the hash table 104. An insertion module 110 may also include a hash function. The insertion module 110 may take an entry as input, compute deterministically the virtual bucket index where that entry may be stored, and adjust the distribution of virtual buckets among buckets to balance the number of entries stored in the buckets.

In embodiments, buckets 106 may contain an array of entries, which may also be referred to as an array of keys. In embodiments, the array associated with the buckets 106 may contain a fixed number of entries (N). In embodiments, an entry may include a network packet, an identification for a network packet, or data associated with the network packet. In embodiments, an entry may be any other item information that may wish to be stored and/or retrieved from a hash table. In embodiments, each of the buckets 106 may include a counter indicating the number of keys, or entries, that are stored in that bucket.

In embodiments, one or more virtual buckets 108 may be mapped to one or more of the buckets 106, which may also be referred to as a group of buckets. Virtual buckets 108 may contain a choice that may indicate to which group of buckets 106 a particular virtual bucket may be associated. In embodiments, the mapping array 109 may be an array, or other data structure, that identifies the choice of each virtual bucket and maps the relationship between virtual buckets 108 and groups of buckets 106.

In embodiments, computing or networking device 100 may be any one of such devices known in the art, e.g., servers, routers, switches, gateways, and so forth. In particular, in embodiments, computing or networking device 100 may be one of a plurality of networking devices implementing the modular forwarding table scalability technology of U.S. patent application Ser. No. 14/750,918, filed on Jun. 25, 2015, entitled "TECHNOLOGIES FOR MODULAR FORWARDING TABLE SCALABILITY."

Figure 2:
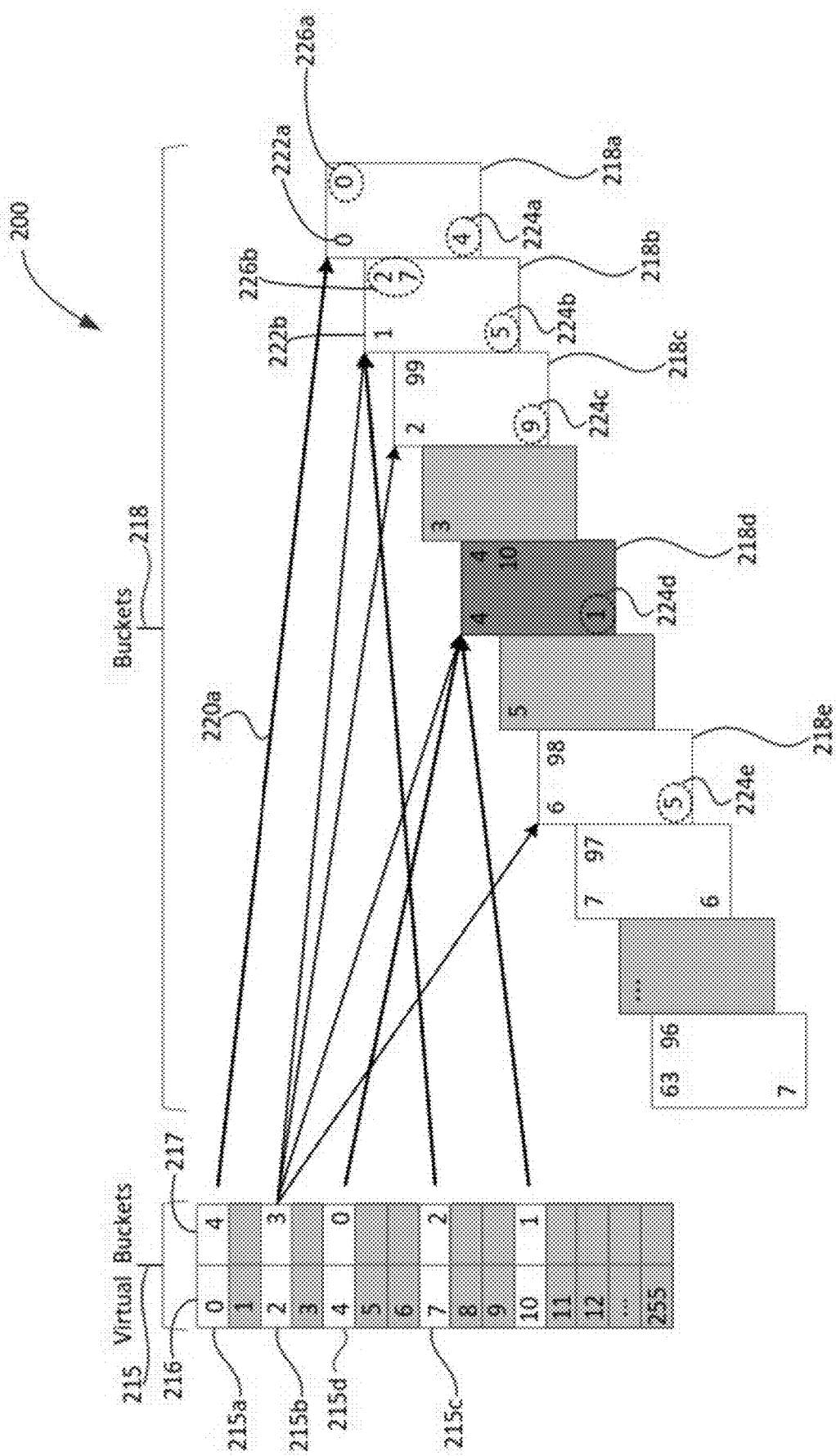
FIGS. 2-4 illustrate an example implementation of the hash table entries rebalancing mechanism of the present disclosure, according to one or more examples of the present specification.
Figure 3:
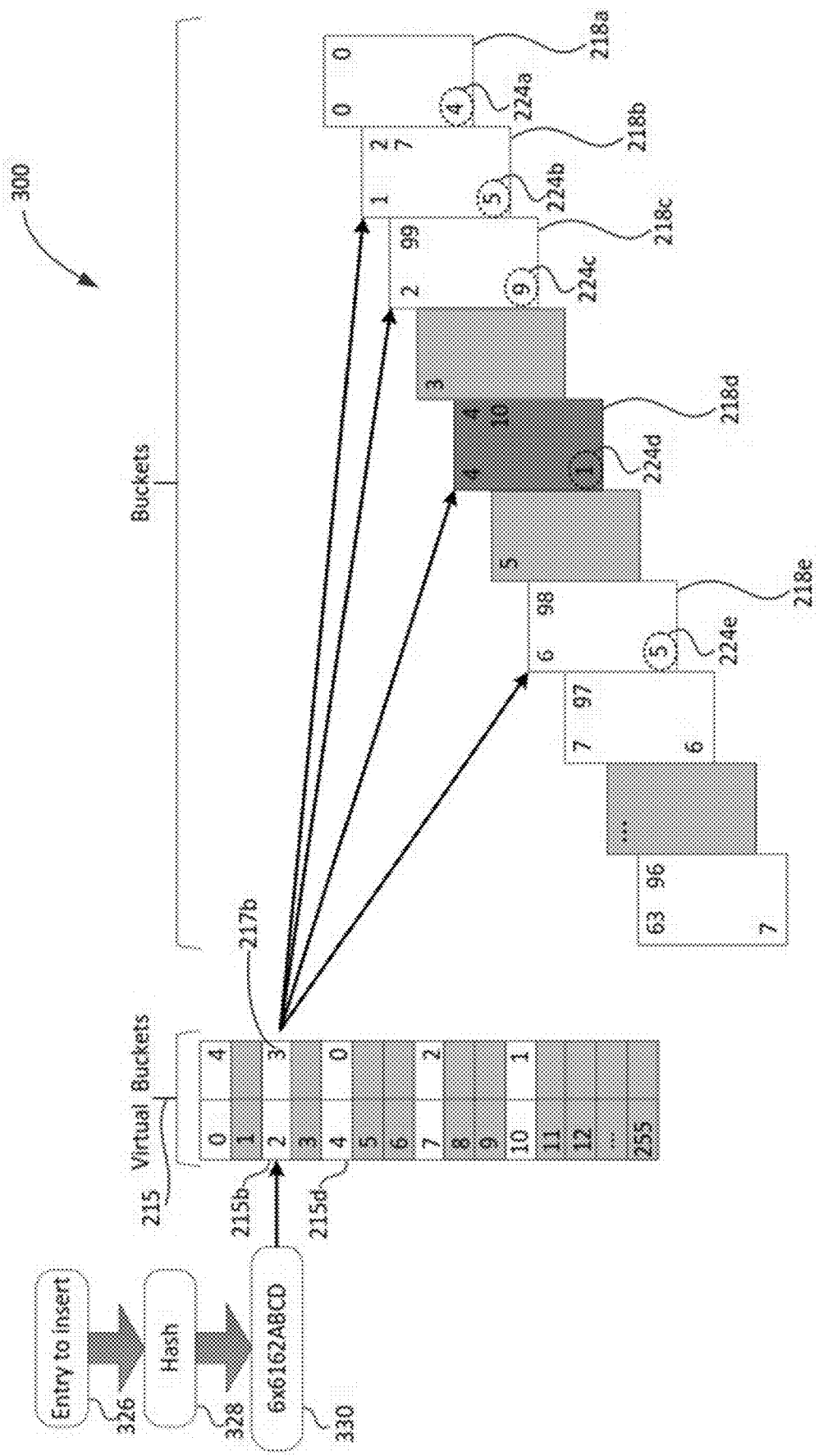
Figure 4:
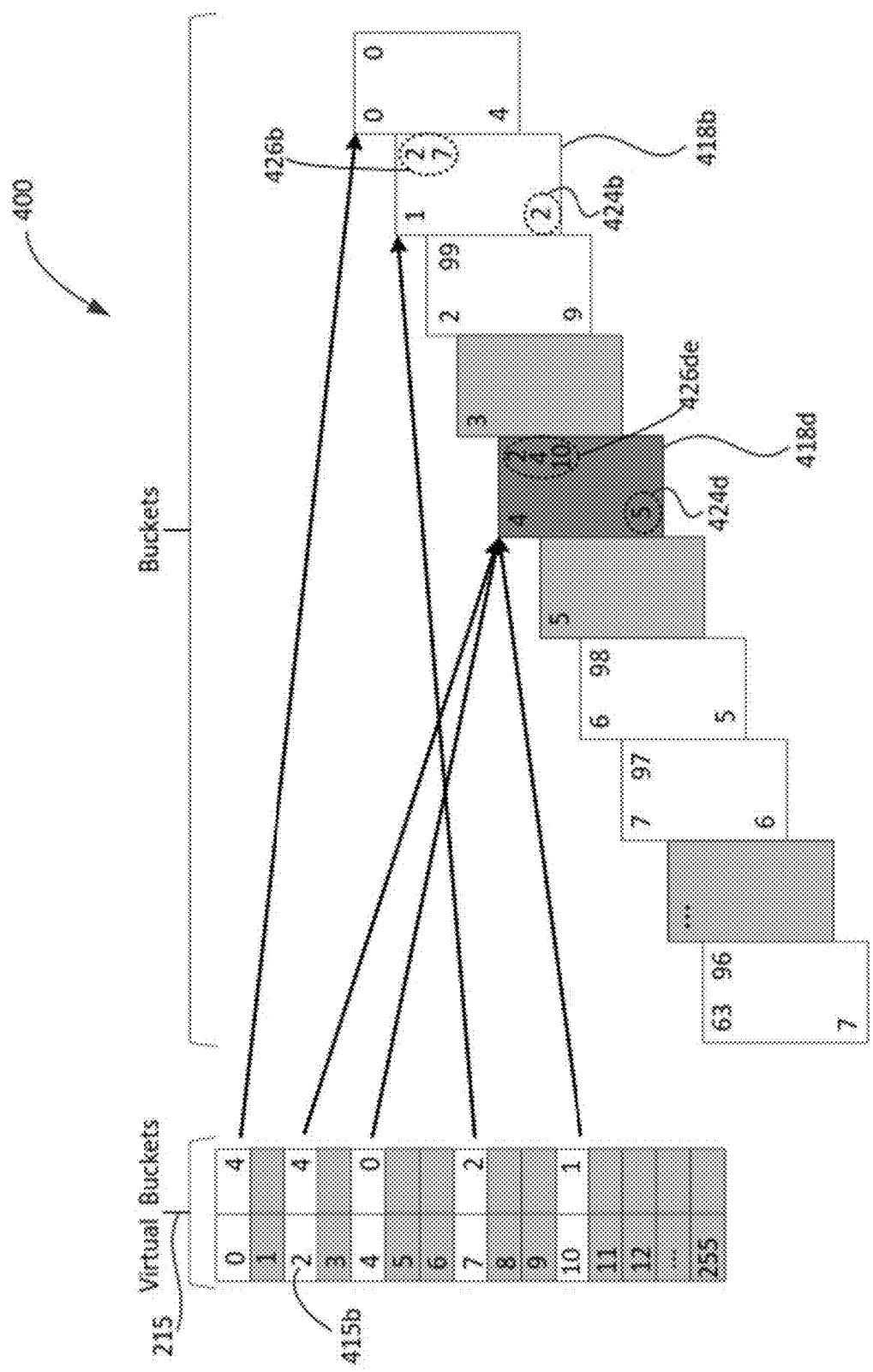

FIGS. 2-4 illustrate an example implementation of the hash table entries rebalancing mechanism of the present disclosure, according to embodiments of the present specification.

FIG. 2 illustrates an example implementation of a hash table that uses 256 (0-255) virtual buckets 215 each having a virtual bucket identifier 216 and a number of entries (keys) 217 associated with the virtual bucket. In embodiments, a hash function applied to an entry may produce an identifier 216 for a virtual bucket (e.g., 215a) to which that entry may be assigned. In embodiments, a virtual bucket may have no entries (e.g., 215d) or multiple entries (e.g., 215a or 215b), as reflected by the number 217 for the virtual bucket.

In the example, there are 64 (0-63) buckets 218. Each respective virtual bucket 215a, 215b and so forth may have four choices for each of the 64 buckets with which it may be associated, as may be indicated by the multiple arrows shown. In embodiments, there may be a different number of choices for each of the respective virtual buckets 215. A mapping array, such as mapping array 109 of FIG. 1, may be used to identify the buckets associated with each virtual bucket. In embodiments, a function (interpolation) may be used to identify the buckets associated with each virtual bucket. This may include, for example, using an offset and multiplication based on an initial number, using a fixed pseudorandom shuffle array, or some other suitable algorithm.

In the example implementation, a bucket identifier may be indicated in the upper left corner, for example, bucket "0" 222a and bucket "1" 222b. For each virtual bucket 215 there may be a group of buckets 218 to which a virtual bucket may be associated. This information may be recorded in a mapping array as discussed above. This example implementation includes, for virtual bucket "0" 215a a mapping to bucket "0" 218a. For virtual bucket "2" 215b a mapping to buckets "1" 218b, "2" 218c, "4" 218d, and "6" 218e. Consequently, bucket "1" 218b is associated with virtual buckets "2" 215b and "7" 215c. The total number of entries associated with a bucket 218a may be indicated in the lower left corner of the bucket, for example the number "4" 224a. This number for a particular bucket may be the sum of each of the entries associated with each of the virtual buckets 215 associated with the bucket. For example, "5" 224b is the sum of the number of entries of virtual bucket 2 (3) and virtual bucket 7 (2).

FIG. 3 illustrates an example implementation of an insertion of an entry into the hash table. For example, an entry to insert 326 may have part of its data used as input to a hash function 328 that may result in a hash value 330. In this example, the hash value 330 corresponds to virtual bucket "2" 215b that already has 3 entries associated with it 217b. Virtual bucket "2" 215b is associated with four buckets 218b, 218c, 218d, 218e.

The four buckets 218b, 218c, 218d, 218e associated with virtual bucket "2" 215b are examined to determine whether rebalancing may be needed. The current entry counts 224b, 224c, 224d, 224e for each of the four buckets 218b, 218c, 218d, 218e are compared to determine which bucket has the lowest number of entries. In this example, bucket "4" 218d has an entry count of "1" 224d, which is lower than "5" 224b, "9" 224c or "5" 224e. Therefore, rebalancing of the hash table may proceed by moving the entries associated with virtual bucket "2" 215b from bucket "1" 218b to bucket "4" 218d. After rebalancing, the entry 326 may be inserted into bucket "4" 218d. In embodiments, the insertion may happen first, for example into bucket "1" 218b, and then rebalancing performed after insertion.

FIG. 4 illustrates an example implementation of rebalancing based on an insertion of an entry into the hash table. The four entries of virtual bucket "2" 415b, which may be similar to 215b of FIG. 3, but now incremented by one to account for the inserted entry, is associated with bucket "1" 418b, which may be similar to bucket "1" 218b of FIG. 3, have been moved to bucket "4" 418d, which may be similar to bucket "4" 218d of FIG. 3. As a result, the bucket "1" count 424b, which may be similar to 224b of FIG. 3, is now 2 (5-3), and the bucket "4" count 424d, which may be similar to 224d of FIG. 3, is now 5 (the original 1 entry plus the 3 entries moved plus the 1 new entry inserted).

Figure 5:
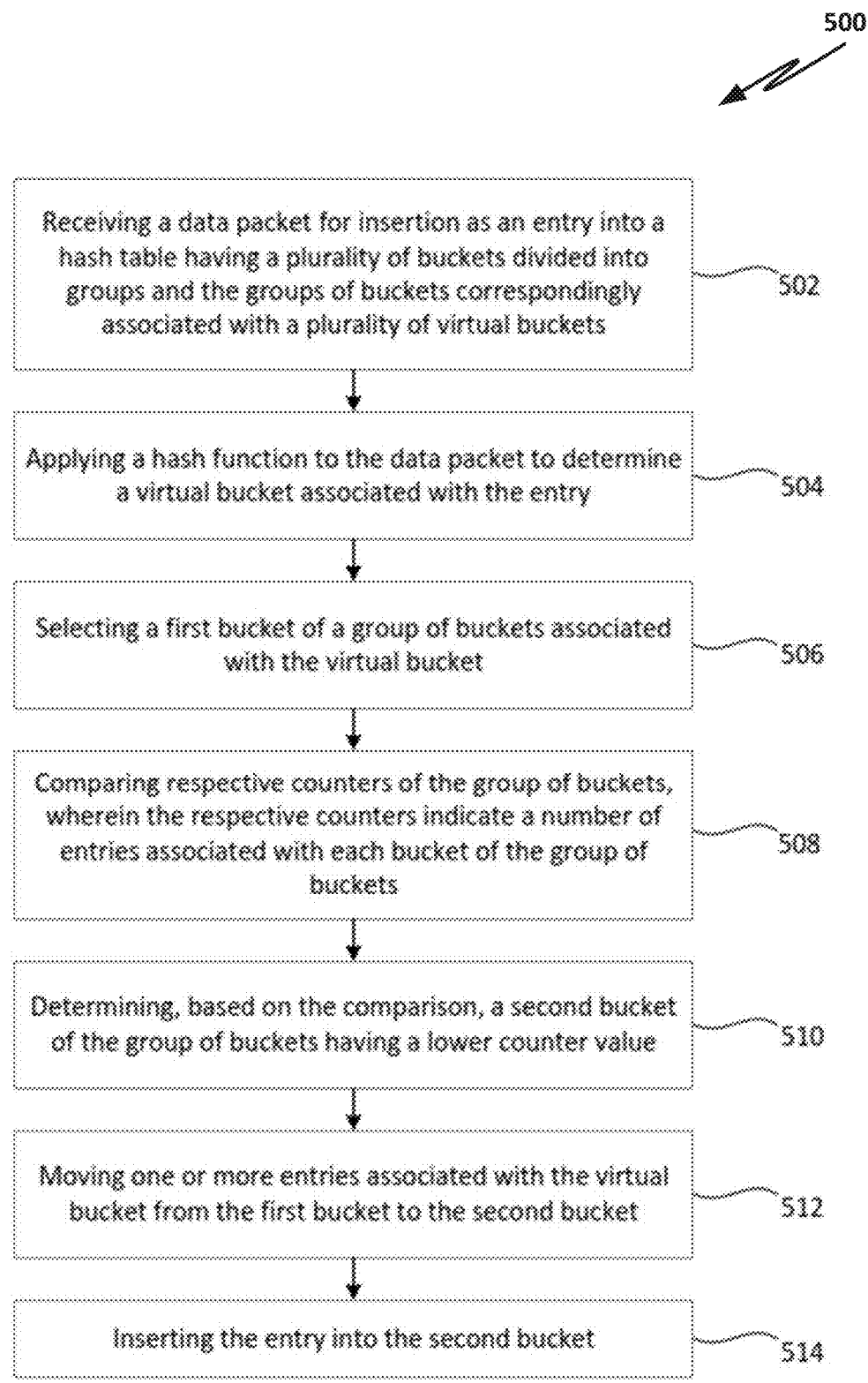
FIG. 5 illustrates an example method for rebalancing entries in a hash table using virtual buckets, according to one or more examples of the present specification.

FIG. 5 illustrates an example method for rebalancing entries in a hash table using virtual buckets, according to one or more examples of the present specification. The process 500 may be performed, for example, by the device 100 of FIG. 1 or the system 600 (e.g., computing device) configured to implement the insertion module 650, similar to insertion module 110 and/or the hashing function module 852, similar to hashing function 328, described in reference to FIGS. 1-5.

The process 500 may begin at block 502, and may include receiving a data packet for insertion as an entry into a hash table having a plurality of buckets divided into groups and the groups of buckets correspondingly associated with the plurality of virtual buckets. In embodiments, this may include a plurality of buckets such as buckets 218 of FIG. 2. In embodiments, the buckets may include a number of entries, for example entries of data packets. There may be a fixed number of buckets (M). The buckets may include a fixed number of slots for entries (N). The plurality of virtual buckets, such as virtual buckets 215 of FIG. 2, may each mapped to a group of one or more buckets. In embodiments, because the number of virtual buckets 215 outnumbers the number M of buckets 218, a hashing function, for example as implemented by the hashing function module 652 of FIG. 6 or 328 of FIG. 3, may distribute hashed entries over the virtual buckets with a smaller maximum non-virtual bucket size. In embodiments, an entry may include all or a portion of the data packet, or may be some other data item that is to be stored in a hash table and later retrieved.

At block 504, the process 500 may include applying a hash function to the data packet to determine a virtual bucket associated with the entry. In embodiments, the hash function may be implemented by the hash function module 652 of FIG. 6 or 328 of FIG. 3. In embodiments, the hash function may be one of any suitable hash functions, where the results of the hash function are to identify a virtual bucket to which the entry may be associated.

At block 506, the process 500 may include selecting a first bucket of a group of buckets associated with the virtual bucket. In embodiments, this may include the functionality described with respect to FIG. 3 or the insertion module 650 of FIG. 6. In embodiments, there may be a default bucket within the group of buckets for a virtual bucket identified as the first bucket. For example, this may be the bucket having the lowest identification number, such as bucket 218b of FIG. 3. In embodiments, some other suitable algorithm may be used to select the first bucket. In embodiments, a mapping array, such as mapping array 109 of FIG. 1, may be used to identify the virtual bucket and to identify one or more buckets, or a group of buckets, that are associated with the virtual bucket. In addition, the mapping array 109 may be used to determine the default bucket or first bucket associated with the virtual bucket. In embodiments, the computational complexity of the actions of this block may involve O(1) additional time for the indirect action of hashing to a virtual bucket in order to determine a bucket.

At block 508, the process 500 may include comparing respective counters of the group of buckets, wherein the respective counters indicate a number of entries associated with each bucket of the group of buckets. In embodiments, the counters may be similar to a counter 224a associated with bucket 218a of FIG. 2. In embodiments, the counter for a bucket may count entries associated with multiple virtual buckets that are associated with the bucket.

At block 510, the process 500 may include determining, based on the comparison, a second bucket of the group of buckets having a lower counter value. In embodiments, the second bucket of the group of buckets may correspond to bucket "4" 218d of FIG. 2, having a counter value of 1 224d. In embodiments, the computational complexity of the actions of blocks 508 and/or 510 may involve O(number of buckets associated with each virtual bucket) number of bits used to identify a group of buckets) (which simplifies to O(1)) additional time to scan through groups of buckets to select a second bucket.

At block 512, the process 500 may include moving one or more entries associated with the virtual bucket from the first bucket to the second bucket. In embodiments, the result of this move may be seen by the two entries associated with virtual bucket "2" 415a moved from bucket "1" 418b to bucket "4" 418d. In embodiments, the entries associated with other virtual buckets that are associated with bucket "1" 418b are not moved. In embodiments, all of the entries associated with the virtual bucket "2" 415a may be moved to the second bucket "4" 418d. In embodiments, the counts associated with each bucket may be updated accordingly. In embodiments, the computational complexity of the actions of this block may involve O(length of key*virtual bucket size) (which again simplifies to O(1)) additional time for moving entries from the first to the second bucket.

At block 514, the process 500 may include inserting the entry into the second bucket. In embodiments, the result of this insertion may be seen by incrementing the entry count of the counter 424d associated with bucket "4" 418d, as well as incrementing the element count of virtual bucket "2" 417a from 3 to 4 as shown in FIG. 4. In embodiments, the computational complexity of the actions of this block may involve O(1) additional time for updating counters.

It should be understood that the actions described in reference to process 500 may not necessarily occur in the described sequence. In addition, some actions may be added or omitted.

Figure 6:
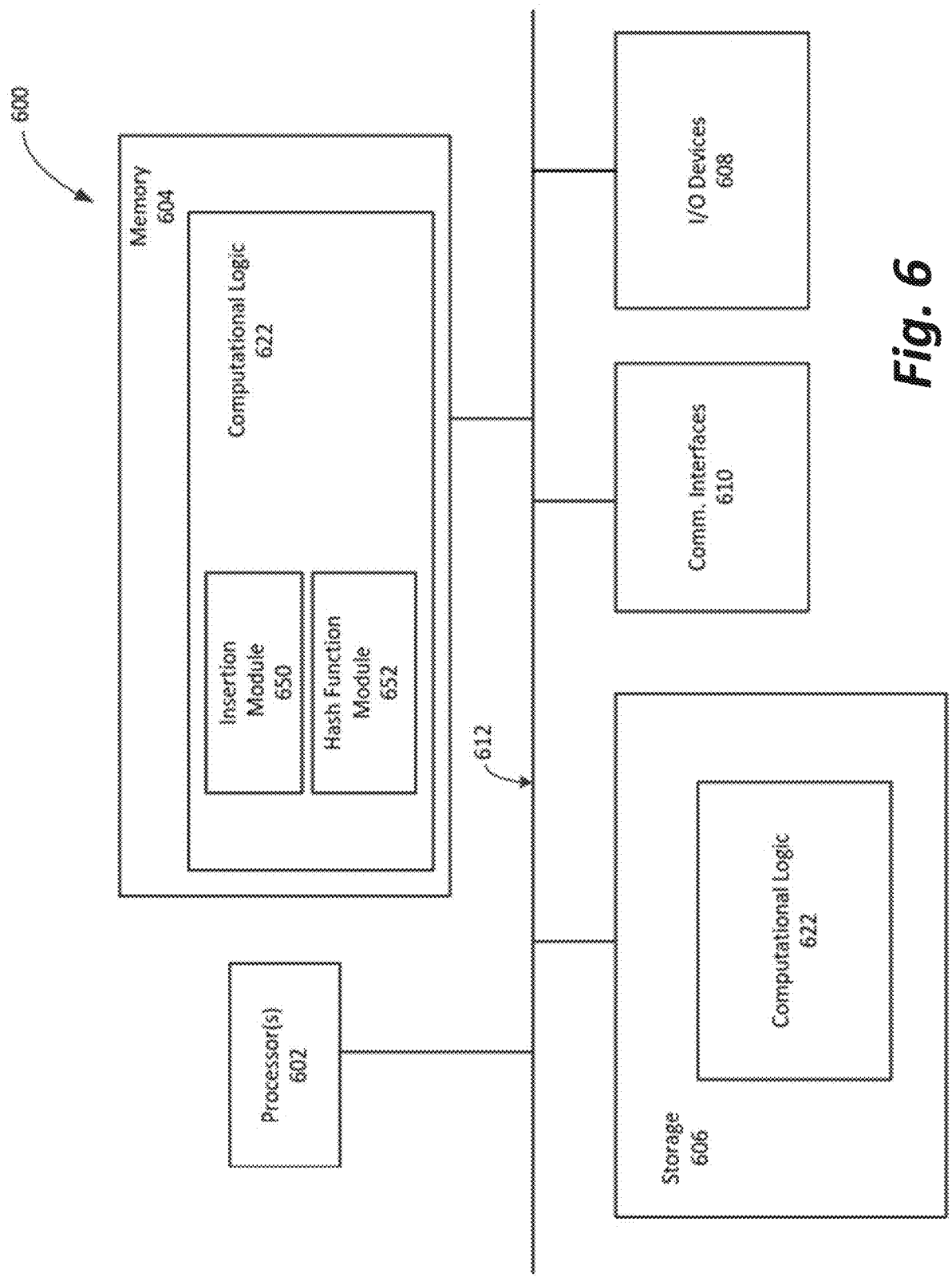
FIG. 6 illustrates a block diagram of an example architecture of a computing/networking device suitable for use to practice the present disclosure, according to one or more examples of the present specification.

FIG. 6 illustrates a block diagram of an example architecture of a computing/networking device suitable for use to practice the present disclosure, according to one or more examples of the present specification. As shown, computing device 600 may include one or more processors 602, each having one or more processor cores, and system memory 604. The processor 602 may include any type of unicore or multi-core processors. Each processor core may include a central processing unit (CPU), and one or more level of caches. The processor 602 may be implemented as an integrated circuit. The computing device 600 may include mass storage devices 606 (such as diskette, hard drive, volatile memory (e.g., dynamic random access memory (DRAM)), compact disc read only memory (CD-ROM), digital versatile disk (DVD) and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 600 may further include input/output (I/O) devices 608 such as a display, keyboard, cursor control, remote control, gaming controller, image capture device, one or more three-dimensional cameras used to capture images, and so forth, and communication interfaces 610 (such as network interface cards, modems, infrared receivers, radio receivers (e.g., Bluetooth), and so forth). I/O devices 608 may be suitable for communicative connections with user devices or other system devices. In some embodiments, I/O devices 608 when used as user or system devices may include a device necessary for implementing the functionalities of receiving a data packet for insertion as an entry as described in reference to FIG. 5.

The communication interfaces 610 may include communication chips (not shown) that may be configured to operate the device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computing device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions implementing the operations and functionalities associated with FIG. 1 and/or FIG. 5, generally shown as computational logic 622. Computational logic 622 may be implemented by assembler instructions supported by processor(s) 602 or high-level languages that may be compiled into such instructions.

In embodiments, the Computational Logic 622 may contain an insertion module 650, which may perform one or more of the functions associated with FIGS. 1-5. Computational Logic 622 may contain a hash function module 652, which may perform one or more of the hash functions associated with FIGS. 1-5.

The permanent copy of the programming instructions may be placed into mass storage devices 606 in the factory, or in the field, though, for example, a distribution medium (not shown), such as a compact disc (CD), or through communication interfaces 610 (from a distribution server (not shown)).

In embodiment, computing device 600 may be a wearable device, a smartphone, a computing tablet, a laptop computer, a desktop computer, a server, a set-top box, a game console, a router, a switch, a gateway, or other networking equipment.

Figure 7:
FIG. 7 illustrates an example computer-readable storage medium with instructions configured to enable a computing/networking device to practice aspects of the present disclosure, according to one or more examples of the present specification.

FIG. 7 illustrates an example computer-readable storage medium with instructions configured to enable a computing/networking device to practice aspects of the present disclosure, according to one or more examples of the present specification. As illustrated, non-transitory computer-readable storage medium 702 may include a number of programming instructions 704 (e.g., including insertion module 650 and hashing function module 652). Programming instructions 704 may be configured to enable a device, e.g., computing device 600, in response to execution of the programming instructions, to perform one or more operations of the processes described in reference to FIGS. 1-5. In alternate embodiments, programming instructions 704 may be disposed on multiple non-transitory computer-readable storage media 702 instead. In still other embodiments, programming instructions 704 may be encoded in transitory computer-readable signals.

Referring also to FIG. 6, for some embodiments, processor 602 may be packaged together with a computer-readable storage medium having programming instructions 704 configured to practice all or selected aspects of the hash table insertion and rebalancing related operations earlier described. For one embodiment, processor 602 may be packaged together with a computer-readable storage medium having programming instructions 704 to form a System in Package (SiP). For one embodiment, processor 602 may be integrated on the same die with a computer-readable storage medium having programming instructions 704. For one embodiment, processor 602 may be packaged together with a computer-readable storage medium having programming instructions 704 to form a System on Chip (SoC).

Figure 8:
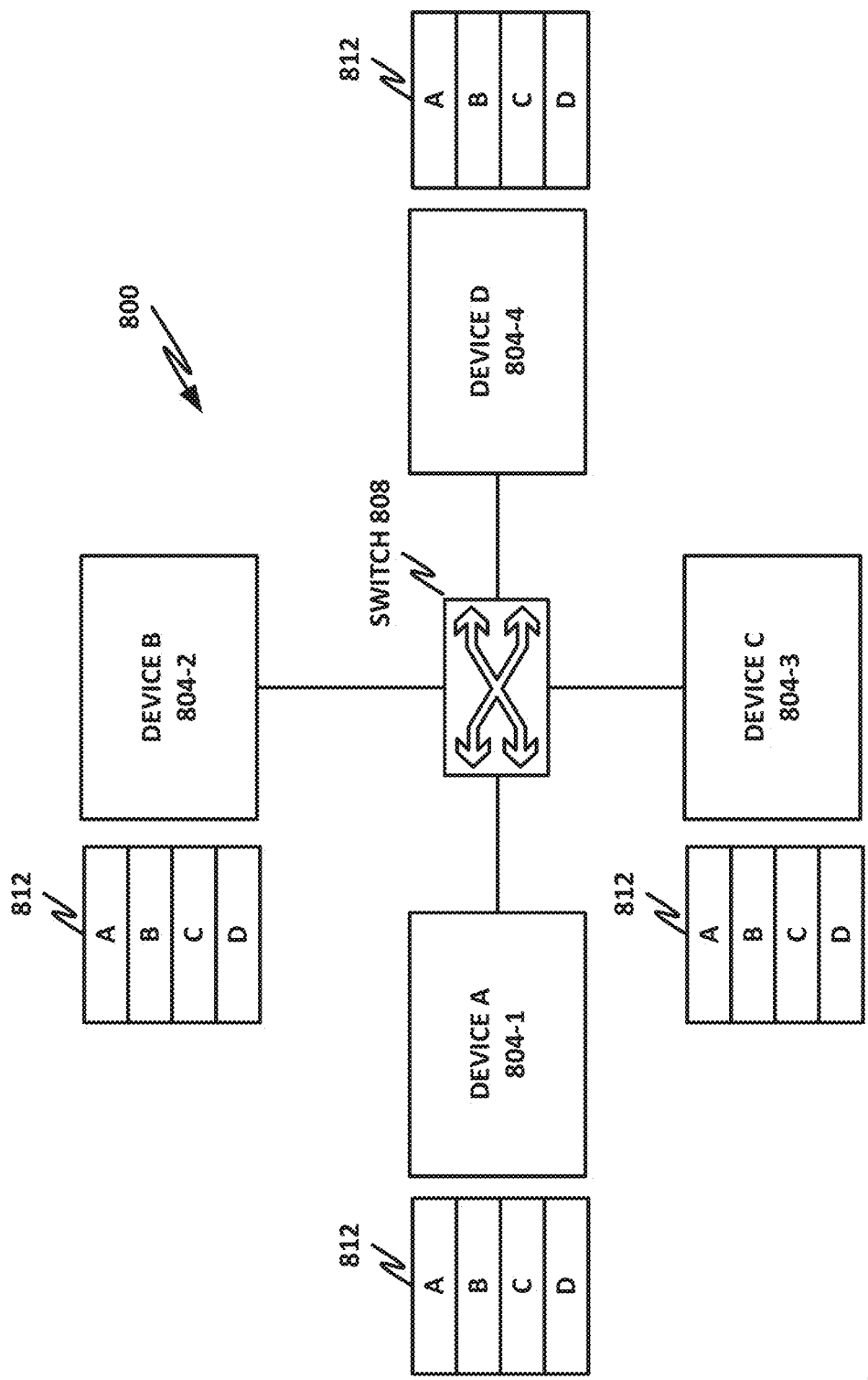
FIG. 8 is a block diagram of an example networking cluster, according to one or more examples of the present specification.

FIG. 8 is a block diagram of an example networking cluster according to one or more examples of the present specification. In the example of FIG. 8, cluster 800 includes a number of processing devices labeled here as device A 804-1, device B 804-2, device C 804-3, and device D 804-4. Devices 804 form peer nodes that together provide a distributed networking function. In one embodiment, devices 804 may be substantially identical commodity devices that can be scaled in number to provide the necessary computing capacity and bandwidth. The distributed networking function may be, by way of nonlimiting example, a distributed switch, a distributed router, or a distributed web server. Embodiments of the distributed network function may include one or more nodes that provide a DoS mitigation engine.

By way of illustrative example, each device 804 could keep an identical copy of all four flow tables 812 in its own memory. Thus, for example, if a packet arrives at device A 804-1, device A can query flow lookup table 812 and determine that the egress port for this packet is on device D 804-4. Thus, device A can route the packet via switch 808 to device D 804-4, and device D can then look up the appropriate flow on its action table, perform the appropriate action, and direct the packet to the appropriate egress port.

A disadvantage of this configuration is that each input device 804 must maintain a complete copy of the flow table 812, thus consuming memory, and increasing workload.

Some embodiments may reduce memory usage by dividing flow table 812 into four parts, in which case each device 804 may host one of the four segments of flow table 812. However, this embodiment also has disadvantages. For example, if device A 804-1 includes only part of the flow table, an incoming packet may not match any entry on the part of the flow table owned by device A 804-1. Thus, device A 804-1 can then broadcast or direct the packet in a "round-robin" fashion to the other devices, until a device finds the matching entry in its flow table.

Another complication is that there is not one-to-one mapping between the sections of the hash table and the actual egress ports that a packet is directed to. For example, a packet could come to device A 804-1, and traverse the network in round-robin fashion from device A 804-1 to device B 804-2 to device C 804-3, where device C 804-3 may successfully find the appropriate rule for directing the traffic. However, this rule could actually point to an egress port on device A 804-1, in which case device C 804-3 has to then switch the packet back to device A 804-1, so that device A 804-1 can perform the actual flow work on the packet and direct it to the appropriate egress interface. This can result in substantial performance degradation.

Figure 9:
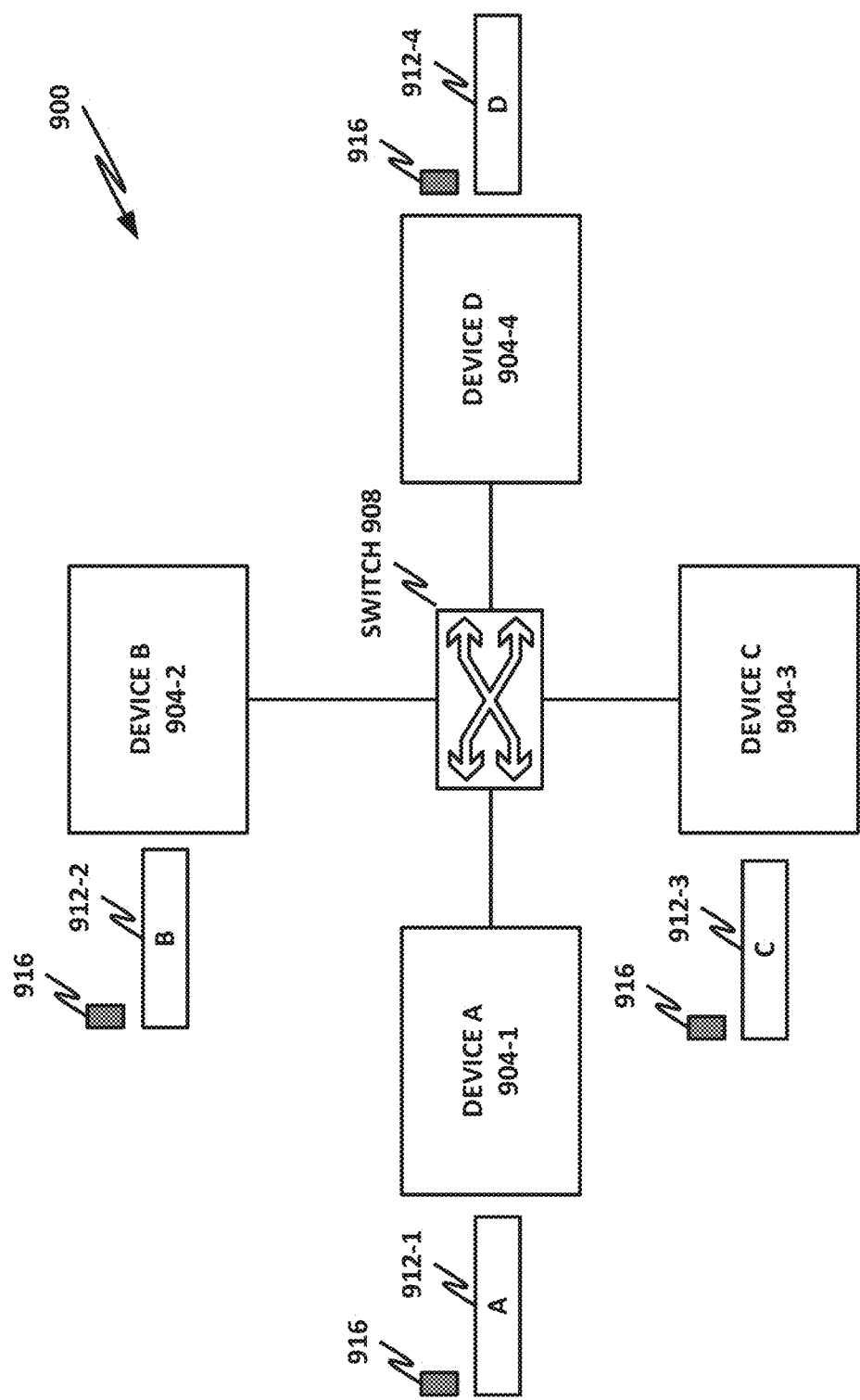
FIG. 9 illustrates an improvement with regard to packet processing using EFD technology, according to one or more examples of the present specification.

FIG. 9 illustrates an improvement on this system which may optionally employ the EFD technology discussed in the present specification. In this example, each device 904 has its own flow lookup table. As previously discussed, the flow lookup table can be divided into four parts, thus saving memory. Advantageously, using a perfect hash mechanism, each flow table section 912 may have only the corresponding entries for its device 904. For example, table 912-1 includes only entries for device A 904-1. Table 912-2 includes only hash entries for device B 904-2. Table 912-3 includes only entries for device C 904-3. Table 912-4 includes only entries for device D 904-4. This can be achieved using a two-level hash, including a perfect hash which can be accomplished via brute force for new entries as necessary.

Each device 904 also includes an identical EFD table 916. The EFD uses perfect hashing and does not store the flow keys for each entry, but rather stores for each flow only the hash value that when used on the input flow will result in the designated target. This significantly reduces the size of the table. When a flow is received, the first-level lookup will always point to a valid destination with no membership test at the input node. It is up to the destination node to detect new flows and handle them. For example, a packet arriving on device A 904-1 may be checked against EFD table 916. EFD table 916 is advantageously much smaller than the complete flow lookup table 912. Every lookup in EFD table 916 results in a valid destination with no membership test at the input node, because EFD doesn't store the exact key and doesn't perform an exact match on the key. Given any arbitrary key, it will always point to a valid destination. In embodiments of the present specification, the key is checked at the destination to determine ownership, or whether the key is new and previously unknown.

Device A 904-1 may determine via EFD table 916 that the correct destination node for the incoming packet is device D 904-4. Device A then sends the packet to device D 904-4 via switch 908.

Device D 904-4 then checks its complete flow entry table 912-4, for the appropriate flow action for the packet. If there is no existing flow for the packet, it is up to device D to detect the new flow and handle it appropriately, such as by computing a new flow entry by brute force. If the packet is determined to be a malicious packet based on deep packet inspection or, for example, certain counters and thresholds on new requests per source ID, such as a malware packet, then the packet may be directed to a null destination such as a honeypot, a circular buffer, or some other null destination.

While this provides very high lookup performance, it can expose the cluster 900 to certain types of DoS attacks. For example, an attacker may flood the input devices with invalid packets, which are then hashed to the various devices 904, and the devices have to determine that the packets are invalid and direct them to a null destination. Note that any device 904 could be an ingress port, and any device 904 could have the appropriate egress port.

DoS attacks can be mitigated, however, by detecting DoS behavior at the destination node, for example, by keeping track of source addresses of flows that miss any flow table lookup. A feedback mechanism may then be propagated out to the other nodes so that when they serve as input devices for incoming attacks, they can have a rule that automatically directs the traffic to a null destination without forwarding it to the destination node according to the EFD table. This reduces the waste of cluster resources.

Note that the EFD table 916 is very compact and efficient and may be built using a two-tier hash scheme such as a perfect hash to distribute millions of flows to a cluster while maintaining the larger second table 912 only in part on each node. Specifically, each flow lookup table 912 may be only 1/n of the size of the full table, depending on the number of nodes in the cluster.

The second-level table 912 can be built using any appropriate lookup scheme, such as cuckoo hash, J-hash, or similar.

As described above, EFD table 916 uses perfect hashing to support large numbers of flows, such as in the millions, of flow keys. Perfect hashing guarantees a collision-free storage of keys, meaning that given a valid key the lookup process always results in the correct value (destination) associated with the key if the key has already been inserted. Thus, there is no need to double check or match that the key is the same as the one that has been inserted. Therefore, key storage itself is not provided in EFD table 916, thus allowing EFD table 916 to be very small, and may in some examples fit in cache memory for millions of keys. This provides a significant boost in lookup performance. The lookup process itself may be reduced from slow memory access and may thus be provided in some examples in cache.

Given some key, whether new or already inserted, EFD table 916 always produces a result for the destination. If the flow has been pre-inserted, it is guaranteed by the perfect hash that the result is correct. For new flows, the result may be a valid destination node, because the EFD does not provide a membership test, and the packet is then forwarded to that destination node. It is then the responsibility of the destination node to detect new flows and insert them in the flow table if they are valid flows. Again, note that any device 904 in cluster 900 may act as the input node in an EFD lookup, and any device, including the same device or a different device 904, may be the destination node.

Note that devices 904 may include hardware elements similar to those of device 600 of FIG. 6, including appropriate memory 604, computational logic 622, processors 602, storage 606, communication interfaces 610, and I/O devices 608. Note that in addition to the insertion module 650 and hash function module 652 of FIG. 6, some or all devices may be provided with a denial of service mitigation engine 1030 of FIG. 10.

Figure 10:
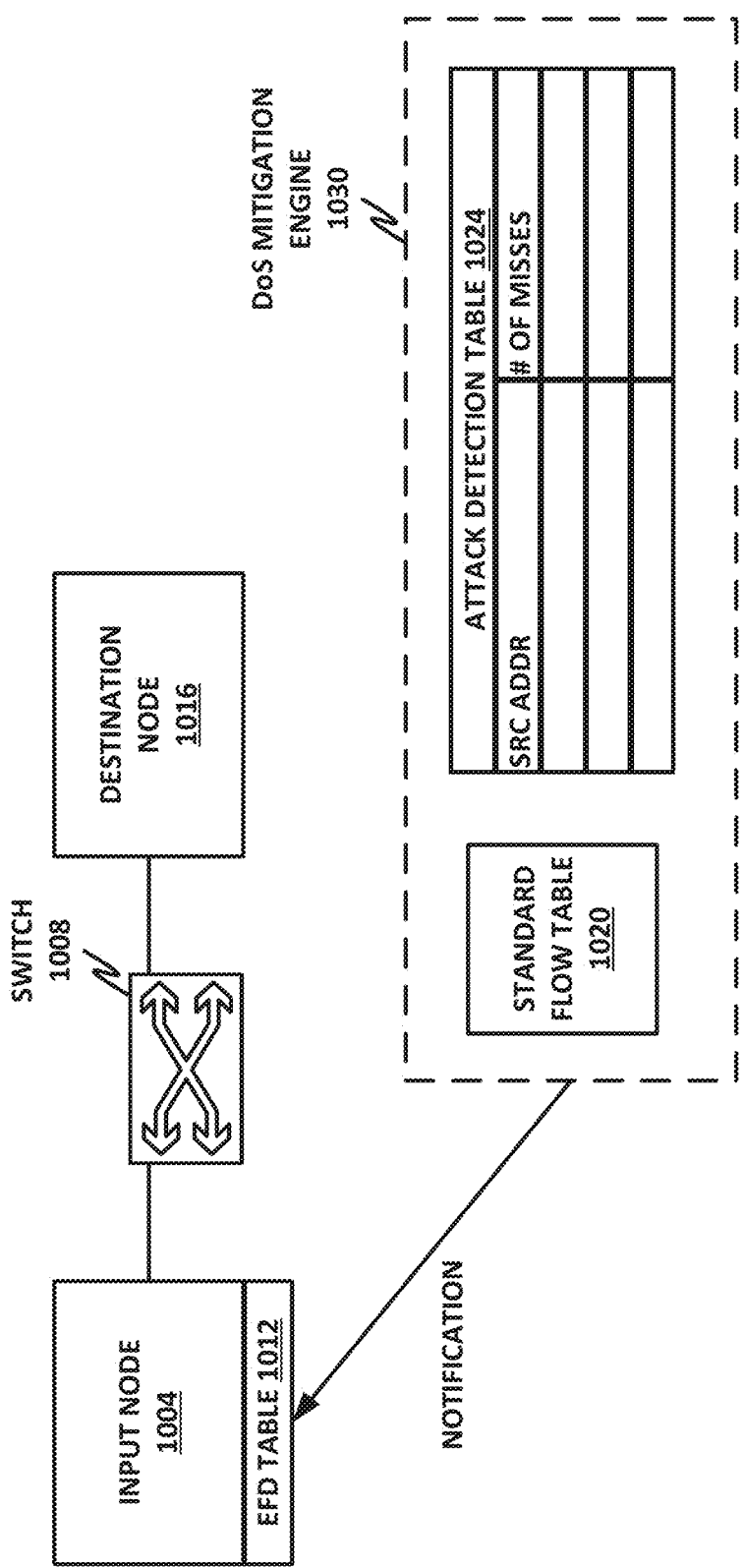
FIG. 10 illustrates a destination node that may include a denial of service (DoS) mitigation engine, according to one or more examples of the present specification.

FIG. 10 illustrates a destination node 1016 that may include a DoS mitigation engine 1030, according to one or more examples of the present specification. Note that in this figure, input node 1004 and destination node 1016 may be substantially identical except that they service different destinations in the cluster. In other words, destination node 1016 and input node 1004 could each be an example of a device 904 of FIG. 9. Also note that DoS mitigation engine 1030 may perform different operations, depending on the instantaneous role of the node in the distributed network function. For example, when the node is acting as destination node 1016, it may detect DoS attacks and propagate notification of the attacks out to other nodes. When the node is acting as input node 1004, DoS Engine 1030 may detect incoming DoS packets and handle them according to a first-level hash as described in this specification.

Similarly, switch 1008 may provide switching similar to switch 908 of FIG. 9.

Destination node 1016 may be configured to detect a DoS attack by recording sources of flows that are missed in a local table, such as attack detection table 1024. This table may be provided in addition to standard flow table 1020, which may be similar to the flow tables 912 illustrated in FIG. 9.

The attack detection table 1024 of DoS mitigation engine 1030 may be used to keep track of the number of misses received from a particular source address. If the number of misses exceeds a minimum threshold, then destination node 1016 may determine that the source address is performing a DoS attack against the cluster. Note that this is only one example of a DoS detection mechanism, and other DoS detection mechanisms are known in the art, such as stateful deep packet inspection (DPI) and others. Any detection technique capable of effectively detecting a DoS attack is considered to be compatible with the teachings of the present specification.

When destination node 1016 determines that a DoS attack is occurring, it may provide a notification feedback to input node 1004. This closes the loop, and the input node is now informed of the attack source. Destination node 1016 may send the attack flow key to all other nodes in the cluster, requesting a new insert into their EFD tables, which would be similar to a valid new flow. However, this insert is an indication that the other nodes are to treat the flow as an attack flow. Thus, rather than redirecting packets that are part of the attack flow to a destination node 1016, each node acting as an input node 1004 should instead direct the packet to a null destination, such as a honeypot or a circular buffer.

Figure 11:
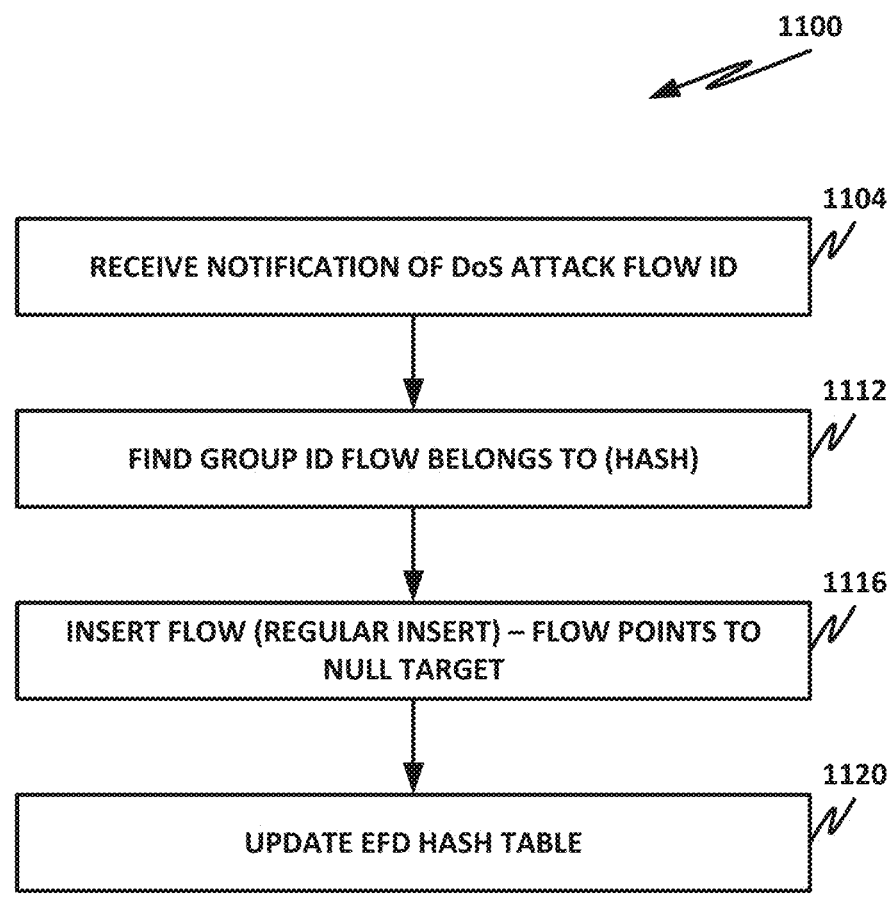
FIG. 11 is a flowchart of a method of performing DoS mitigation, according to one or more examples of the present specification.

FIG. 11 is a flowchart of a method 1100 of performing DoS mitigation, according to one or more examples of the present specification.

When an input node receives a notification of a new DoS attack with a flow ID from one or more destination nodes, the input node inserts this flow into its EFD table similar to inserting a new legitimate flow.

According to method 1100, in block 1104, an input node receives notification of a DoS attack from a destination node.

In block 1112, the input node finds the group ID that the flow belongs to using its hashing function.

In block 1116, the input node inserts the flow using its regular insert function. However, in this case, the destination points to a null destination, including a circular buffer, honeypot, or similar.

In block 1120, the input node updates its EFD hash table by finding the new perfect hash for the group that the new hash function will have when applied to an attack flow ID.

Thus, the difference between a legitimate flow and a DoS flow is that the target value inserted into the EFD table for a legitimate flow will point to a valid destination device, while for an attack flow, the value will point to a null destination (or any predetermined special value). In some examples, the null destination may itself be given an ID similar to a valid destination. In the example of FIG. 9, a hypothetical fifth node could be inserted. However, the fifth node is not an actual processing node, but rather a null destination such as a circular buffer, a discard buffer, or a honeypot. Alternatively, the null destination could simply be a rule that the packet is to be dropped. On the other hand, for legitimate flows, the target will be the designated destination node (i.e., the node that sent out the new flow message).

An EFD table, given a value, will find the perfect hash that will satisfy this value when the key is inserted in a specific group, and will update the hash function to be used for that group. However, note that similar to any new flow, the EFD will not insert the key itself into the EFD table. However, any further packets from this flow will be processed using the updated hash function, and the result will always classify the flow as belonging to the appropriate destination. Thus, any traffic coming from the attack source will always be classified as attack traffic and will be appropriately dropped.

In the case that the destination for attack traffic is an actual honeypot target machine, the honeypot can similarly use thresholds and timeouts to clear an attacker off the attack list if its requests have dropped below a certain threshold. Similarly to marking the flow, dropping a source off the list may simply consist of a new insert with a new legitimate destination as the target for the flow.

The scheme described here mitigates excessive resource consumption at the target node by a DoS attacker. Further optimizations may also be realized to conserve the resources of the input node itself (i.e., the node that computes and stores the EFD).

As mentioned above, EFD resources are consumed to perform the global mapping of incoming flows. A DoS flow will still go through this mapping (i.e., EFD computation) before being marked as an attacker. Thus, further advantages can be realized if the flow can be marked and dropped (or forwarded for special handling such as to a honeypot) as quickly as possible.

An optimization can be realized by encoding the attack indication in the target value. Since with an EFD, a target value can be arbitrarily defined, a flag associated with the flow can be added to the value. Thus, the flag may be used as quickly as possible and this can easily be done by setting the flag as the target value's least significant bit (LSB). A value with the LSB set to 0 indicates that the flow is legitimate, while a value with an LSB set to one indicates an attack flow. Thus, by simply setting the LSB, a flow can be marked as an attack flow without having to perform a full EFD computation. Because the EFD relies on hashing, and because the LSB is the first bit to be computed using the hash function, an attack flow can be marked as soon as a result of this flag is computed when the hash is applied. Thus, there is no need to continue hashing the rest of the flow key, which can be arbitrarily long. Thus, this conserves resources on the input node when an attack flow is encountered. For legitimate flows, the hash result of the LSB will remain 0, and remaining bits may be computed as usual to find the intended target node.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the FIGURES may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided as non-limiting examples of embodiments of the present specification.

Example 1 is a computing apparatus for providing a node within a distributed network function, comprising: a hardware platform; a network interface to communicatively couple to at least one other peer node of the distributed network function; a distributor function including logic to operate on the hardware platform, comprising a hashing module configured to receive an incoming network packet via the network interface and perform on the incoming network packet a first-level hash of a two-level hash, the first level hash being a lightweight hash with respect to a second-level hash, the first level hash to deterministically direct a packet to one of the nodes of the distributed network function as a directed packet; and a denial of service (DoS) mitigation engine to receive notification of a DoS attack, identify a DoS packet via the first-level hash, and prevent the DoS packet from reaching the second-level hash.

Example 2 further comprises a network flow function to receive a directed packet and to perform a second-level hash on the directed network packet, wherein the second-level hash is relatively heavy weight with respect to the first-level hash, and to switch the directed network packet to an egress interface according to the second-level hash.

Example 3 is the computing apparatus of example 2, wherein the second-level hash comprises a flow lookup key.

Example 4 is the computing apparatus of example 3, wherein the flow lookup key is a key to a routing algorithm.

Example 5 is the computing apparatus of example 3, wherein the distributed network function is a distributed switch.

Example 6 is the computing apparatus of example 3, wherein the distributed network function is a distributed router.

Example 7 is the computing apparatus of example 2, wherein the second-level hash is a key to a hash table.

Example 8 is the computing apparatus of example 1, wherein the distributed network function is a distributed web server.

Example 9 is the computing apparatus of any of examples 1-8, wherein the first-level hash is a perfect hash.

Example 10 is the computing apparatus of example 9, wherein the perfect hash is a first-level entry in a flow distributor table having a hash value but no key.

Example 11 is the computing apparatus of any of examples 1-8, further comprising a DoS attack detector to detect a DoS attack.

Example 12 is the computing apparatus of any of examples 1-8, wherein preventing the DoS packet from reaching the second-level hash comprises directing the DoS packet to a null destination.

Example 13 is the computing apparatus of example 12, wherein the null destination is a non-existent node.

Example 14 is the computing apparatus of example 12, wherein the null destination is a honey pot node.

Example 15 is the computing apparatus of example 12, wherein directing the DoS packet to a null destination comprises hashing a least significant bit.

Example 16 is the computing apparatus of any of examples 1-8, wherein preventing the DoS packet from reaching the second-level hash comprises dropping the packet.

Example 17 is one or more tangible, non-transitory computer-readable mediums having stored thereon instructions for providing a node within a distributed network function, the instructions to instruct a processor to: communicatively couple to at least one other peer node of the distributed network function; receive an incoming network packet and perform on the incoming network packet a first-level hash of a two-level hash, the first level hash being a lightweight hash with respect to a second-level hash, the first level hash to deterministically direct a packet to one of the nodes as a directed packet; and receive notification of a DoS attack, identify a DoS packet via the first-level hash, and prevent the DoS packet from reaching the second-level hash.

Example 18 is the one or more tangible, non-transitory computer readable mediums of example 17, wherein the instructions are further to instruct the processor to receive a directed packet and to perform a second-level hash on the directed network packet, wherein the second-level hash is relatively heavy weight with respect to the first-level hash, and to switch the directed network packet to an egress interface according to the second-level hash.

Example 19 is the one or more tangible, non-transitory computer readable mediums of example 18, wherein the second-level hash comprises a flow lookup key.

Example 20 is the one or more tangible, non-transitory computer readable mediums of example 19, wherein the flow lookup key is a key to a routing algorithm.

Example 21 is the one or more tangible, non-transitory computer readable mediums of example 19, wherein the distributed network function is a distributed switch.

Example 22 is the one or more tangible, non-transitory computer readable mediums of example 19, wherein the distributed network function is a distributed router.

Example 23 is the one or more tangible, non-transitory computer readable mediums of example 18, wherein the second-level hash is a key to a hash table.

Example 24 is the one or more tangible, non-transitory computer readable mediums of example 17, wherein the distributed network function is a distributed web server.

Example 25 is the one or more tangible, non-transitory computer readable mediums of any of examples 17-25, wherein the first-level hash is a perfect hash.

Example 26 is the one or more tangible, non-transitory computer readable mediums of example 25, wherein the perfect hash is a first-level entry in an elastic flow distributor (EFD) table having a hash value but no key.

Example 27 is the one or more tangible, non-transitory computer readable mediums of any of examples 17-25, wherein the instructions are further to detect a DoS attack.

Example 28 is the one or more tangible, non-transitory computer readable mediums of any of examples 17-25, wherein preventing the DoS packet from reaching the second-level hash comprises directing the DoS packet to a null destination.

Example 29 is the one or more tangible, non-transitory computer readable mediums of example 28, wherein the null destination is a non-existent node.

Example 30 is the one or more tangible, non-transitory computer readable mediums of example 28, wherein the null destination is a honey pot node.

Example 31 is the one or more tangible, non-transitory computer readable mediums of any of examples 17-25, wherein preventing the DoS packet from reaching the second-level hash comprises dropping the packet.

Example 32 is a computer-implemented method of providing a node within a distributed network function, comprising: communicatively coupling to at least one other peer node of the distributed network function; receiving an incoming network packet and perform on the incoming network packet a first-level hash of a two-level hash, the first level hash being a lightweight hash with respect to a second-level hash, the first level hash to deterministically direct a packet to one of the nodes as a directed packet; and receiving notification of a DoS attack; identifying a DoS packet via the first-level hash; and prevent the DoS packet from reaching the second-level hash.

Example 33 is the method of example 32, further comprising receiving a directed packet and to perform a second-level hash on the directed network packet, wherein the second-level hash is relatively heavy weight with respect to the first-level hash, and to switch the directed network packet to an egress interface according to the second-level hash.

Example 34 is the method of example 33, wherein the second-level hash comprises a flow lookup key.

Example 35 is the method of example 34, wherein the flow lookup key is a key to a routing algorithm.

Example 36 is the method of example 34, wherein the distributed network function is a distributed switch.

Example 37 is the method of example 34, wherein the distributed network function is a distributed router.

Example 38 is the method of example 33, wherein the second-level hash is a key to a hash table.

Example 39 is the method of example 32, wherein the distributed network function is a distributed web server.

Example 40 is the method of any of examples 32-39, wherein the first-level hash is a perfect hash.

Example 41 is the method of example 40, wherein the perfect hash is a first-level entry in an elastic flow distributor (EFD) table having a hash value but no key.

Example 42 is the method of any of examples 32-39, further comprising detecting a DoS attack.

Example 43 is the method of any of examples 32-39, wherein preventing the DoS packet from reaching the second-level hash comprises directing the DoS packet to a null destination.

Example 44 is the method of example 43, wherein the null destination is a non-existent node.

Example 45 is the method of example 43, wherein the null destination is a honey pot node.

Example 46 is the method of any of examples 32-39, wherein preventing the DoS packet from reaching the second-level hash comprises dropping the packet.

Example 47 is the apparatus comprising means for performing the method of any of examples 32-46.

Example 48 is the apparatus of example 47, wherein the means for performing the method comprise a processor and a memory.

Example 49 is the apparatus of example 48, wherein the memory comprises machine-readable instructions, that when executed cause the apparatus to perform the method of any of examples 32-46.

Example 50 is the apparatus of any of examples 47-49, wherein the apparatus is a computing system.

Example 51 is the least one computer readable medium comprising instructions that, when executed, implement a method or realize an apparatus as described in any of examples 32-50.

What is claimed is:

1. A computer-implemented method of providing a node within a distributed network function, comprising:
    communicatively coupling to at least one other peer node of the distributed network function;
    receiving an incoming network packet and perform on the incoming network packet a first-level hash of a two-level hash, the first: level hash being a lightweight hash with respect to a second-level hash, the first: level hash to deterministically direct a packet to one of the nodes as a directed packet; and
    receiving notification of a DoS attack;
    identifying a DoS packet via the first-level hash; and
    prevent the DoS packet from reaching the second-level hash.

2. The method of claim 1 further comprising receiving a directed packet and to perform a second-level hash on the directed network packet, wherein the second-level hash is relatively heavy weight with respect to the first-level hash, and to switch the directed network packet to an egress interface according to the second-level hash.

3. A computing apparatus for providing a node within a distributed network function, comprising:
    a hardware platform;
    a network interface to communicatively couple to at least one other peer node of the distributed network function;
    instructions encoded within a computer-readable medium to instruct the hardware platform to receive an incoming network packet via the network interface and perform on the incoming network packet a first-level hash of a two-level hash, the first-level hash being a lightweight hash with respect to a second-level hash, the first: level hash to deterministically direct a packet to one of the nodes of the distributed network function as a directed packet; and
    a denial of service (DoS) mitigation engine to receive notification of a DoS attack, identify a DoS packet via the first-level hash, and prevent the DoS packet from reaching the second-level hash.

4. The computing apparatus of claim 3, further comprising a network flow function to receive a directed packet and to perform a second-level hash on the directed network packet, wherein the second-level hash is relatively heavy weight with respect to the first-level hash, and to switch the directed network packet to an egress interface according to the second-level hash.

5. The computing apparatus of claim 4, wherein the second-level hash comprises a flow lookup key.

6. The computing apparatus of claim 5, wherein the flow lookup key is a key to a routing algorithm.

7. The computing apparatus of claim 5, wherein the distributed network function is a distributed switch.

8. The computing apparatus of claim 5, wherein the distributed network function is a distributed router.

9. The computing apparatus of claim 4, wherein the second-level hash is a key to a hash table.

10. The computing apparatus of claim 3, wherein the distributed network function is a distributed web server.

11. The computing apparatus of claim 3, wherein the first-level hash is a perfect hash.

12. The computing apparatus of claim 11, wherein the perfect hash is a first-level entry in a flow distributor table having a hash value but no key.

13. The computing apparatus of claim 3, further comprising a DoS attack detector to detect a DoS attack.

14. The computing apparatus of claim 3, wherein preventing the DoS packet from reaching the second-level hash comprises directing the DoS packet to a null destination.

15. The computing apparatus of claim 14, wherein the null destination is a non-existent node.

16. The computing apparatus of claim 14, wherein the null destination is a honey pot node.

17. The computing apparatus of claim 14, wherein directing the DoS packet to a null destination comprises hashing a least significant bit.

18. The computing apparatus of claim 3, wherein preventing the DoS packet from reaching the second-level hash comprises dropping the packet.

19. One or more tangible, non-transitory computer-readable mediums having stored thereon instructions for providing a node within a distributed network function, the instructions to instruct a processor to:

communicatively couple to at least one other peer node of the distributed network function;

receive an incoming network packet and perform on the incoming network packet a first-level hash of a two-level hash, the first-level hash being a lightweight hash with respect to a second-level hash, the first-level hash to deterministically direct a packet to one of the nodes as a directed packet; and receive notification of a DoS attack, identify a DoS packet via the first-level hash, and prevent the DoS packet from reaching the second-level hash.

20. The one or more tangible, non-transitory computer readable mediums of claim 19, wherein the instructions are further to instruct the processor to receive a directed packet and to perform a second-level hash on the directed network packet, wherein the second-level hash is relatively heavy weight with respect to the first-level hash, and to switch the directed network packet to an egress interface according to the second-level hash.

21. The one or more tangible, non-transitory computer readable mediums of claim 20, wherein the second-level hash is a key to a hash table.

22. The one or more tangible, non-transitory computer readable mediums of claim 19, wherein the first-level hash is a perfect hash.

23. The one or more tangible, non-transitory computer readable mediums of claim 22, wherein the perfect hash is a first-level entry in an elastic flow distributor (EFD) table having a hash value but no key.

24. The one or more tangible, non-transitory computer readable mediums of claim 19, wherein the instructions are further to detect a DoS attack.

25. The one or more tangible, non-transitory computer readable mediums of claim 19, wherein preventing the DoS packet from reaching the second-level hash comprises directing the DoS packet to a null destination.

\* \* \* \* \*

UNITED STATES PATENT AND TRADEMARK OFFICE
CERTIFICATE OF CORRECTION

PATENT NO. : 11,005,884 B2
APPLICATION NO. : 15/720821
DATED : May 11, 2021
INVENTOR(S) : Gobriel et al.

Page 1 of 1

It is certified that error appears in the above-identified patent and that said Letters Patent is hereby corrected as shown below:

In the Claims

In Column 20, Claim 1, Line 12, delete "first: level" and insert -- first-level --, therefor.

In Column 20, Claim 1, Line 13, delete "first: level" and insert -- first-level --, therefor.

In Column 20, Claim 2, Line 20, delete "claim 1" and insert -- claim 1, --, therefor.

Signed and Sealed this
Twentieth Day of July, 2021

Drew Hirshfeld
*Performing the Functions and Duties of the
Under Secretary of Commerce for Intellectual Property and
Director of the United States Patent and Trademark Office*